Jan. 27, 1970 W. H. REED III 3,491,857
VISCOUS-PENDULUM-DAMPER
Original Filed Feb. 26, 1965 3 Sheets-Sheet 1

INVENTOR
WILMER H. REED, III

BY

ATTORNEYS

Jan. 27, 1970    W. H. REED III    3,491,857
VISCOUS-PENDULUM-DAMPER
Original Filed Feb. 26, 1965    3 Sheets-Sheet 2

INVENTOR
WILMER H. REED, III
BY
ATTORNEYS

Jan. 27, 1970          W. H. REED III          3,491,857
VISCOUS-PENDULUM-DAMPER
Original Filed Feb. 26, 1965                3 Sheets-Sheet 3

INVENTOR
WILMER H. REED, III

BY

ATTORNEYS

United States Patent Office 3,491,857
Patented Jan. 27, 1970

3,491,857
VISCOUS-PENDULUM-DAMPER
Wilmer H. Reed III, Hampton, Va., assignor to the United States of America as represented by the Administrator of the National Aeronautics and Space Administration
Continuation of application Ser. No. 581,128, Aug. 8, 1966, which is a division of application Ser. No. 435,756, Feb. 26, 1965, now Patent No. 3,310,138. This application Mar. 28, 1968, Ser. No. 717,052
Int. Cl. F16d 63/00
U.S. Cl. 188—1
13 Claims

ABSTRACT OF THE DISCLOSURE

A vibration damper in which a mercury filled pendulous bladder mass is located in a viscous fluid. The pressure in the bladder is remotely variable to alter the size and thus the dampening characteristics. In other embodiment, the tubular container damper has a plurality of scalloped tray sections filled with viscous liquid, each section having a slug mass therein to dissipate energy.

---

The invention described herein may be manufactured and used by or for the Government of the United States of America for governmental purposes without the payment of any royalties thereon or therefor.

This application is a continuation of Ser. No. 581,128, filed Aug. 8, 1966, now abandoned, which in turn, is a division of Ser. No. 435,756, filed Feb. 26, 1965, now U.S. Patent No. 3,310,138.

This invention relates generally to vibration damping and more particularly to a viscous pendulum damper having linear damping characteristics.

Tall, slender structures such as towers, smoke stacks and space vehicles erected on the launch pad are susceptible to wind induced bending oscillations. In a steady wind these oscillations are a result of aerodynamic forces associated with vortices shed from the body and normally occur in a plane perpendicular to the wind direction. It is not uncommon for the magnitude of these oscillatory loads to exceed, by a factor of five or more, the loads associated with the steady drag forces of the structure. Thus, in order to insure that a structure is capable of surviving wind induced oscillations, wind tunnel investigations on aeroelastically scaled models are usually conducted prior to erection of the full scale structure. One of the key parameters which governs the magnitude of wind induced oscillations is damping, the capacity of a structure to absorb energy. In order to obtain meaningful data from wind tunnel studies of the problem, it is highly desirable that the damping in the model be varied to cover a range of values likely to be found on the full scale article. Investigation of the effects of internal damping on response of a structure is particularly significant in the event that aerodynamic damping becomes negative at some critical wind speed. In such cases, wind tunnel data can indicate the amount of damping in the full scale structure required to avoid possible catastrophic oscillations.

Prior methods of varying the damping of aeroelastic ground wind load models in a controlled manner have in general been unsatisfactory. These methods include varying the tension in joints on the model, connecting wires from the model to a dashpot damper or coating the structure with an energy absorbing material. Various difficulties are associated with each of these methods; for example, damping variations obtained by adjusting the tension of bolts in a joint are unpredictable and are likely to change during the course of a test run, the attachment of external wires to the model presents aerodynamic interference problems and energy absorbing coatings tend to be relatively ineffective unless applied to the model in regions of high strain. Furthermore, these methods of adding to a structure frequently exhibit nonlinear characteristics which greatly complicate the interpretation of experimental data obtained.

To overcome the above noted difficulties, the present invention contemplates the use of a pendulum-like member which reacts against motion of a viscous fluid to dissipate energy and thereby damp vibrations.

It is an object of this invention to provide a vibration damper having linear damping characteristics and bidirectional operation while being capable of precise regulation.

Another object of the instant invention is to provide a viscous pendulum vibration damper for tuned or untuned operation.

The further object of this invention is to provide a remotely controlled viscous pendulum damper.

Still another object of this invention is to provide a vibration damper wherein tray supported slugs act against a viscous fluid to dissipate energy.

A still further object of the instant invention is to provide an expandable pendulous mass for relative motion with a viscous fluid to damp vibrations of a primary body.

It is an object of this invention to provide a viscous vibration damper having a plurality of interfitting trays filled with a viscous fluid to react against disc-shaped slugs disposed on the trays.

It is a further object of this invention to provide a vibration damper comprised of one or more modules made up of a plurality of interfitting trays having slugs disposed thereon to react with a viscous fluid filling the tray member.

Still another object of this invention is to provide a viscous damper for opposing the oscillatory motions of smoke-stacks and the like by utilizing a tubular container in the form of an arc of a circle with a fluid substantially filling the container to act against a plurality of spherical masses disposed therein.

Generally, the foregoing and other objects are accomplished by locating a pendulous mass in a viscous fluid. For example, slugs may be positioned on trays having spherically concave upper surfaces and which are positioned within a container substantially filled with a viscous fluid or an expansible bladder may be connected to mercury filled bellows by means of a tubular member inside a container substantially filled with a viscous fluid. By altering the number of slugs, or by varying the pressure activating the mercury filled bellows to thereby vary the size and weight of the expansible bladder, the damping characteristics are altered. In the latter situation, a conduit may connect a remote controller with actuator bellows for varying the pressure on the mercury filled bellows to establish a remotely controlled viscous pendulum damper.

A more complete appreciation of the invention and many of the attendant advantages thereof will be readily apparent as the same becomes better understood by reference to the following description when considered in connection with the accompanying drawings wherein.

Figure 1:
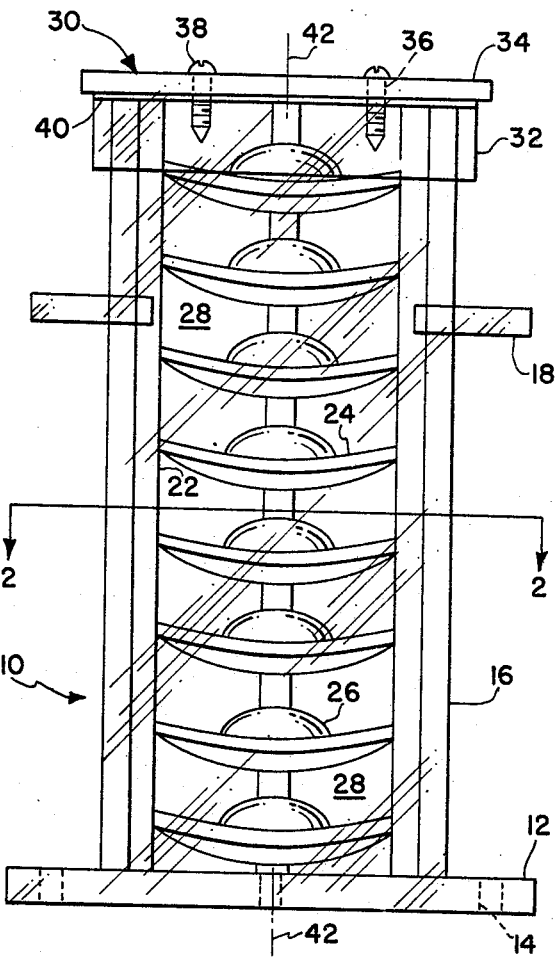
FIG. 1 is a cross-sectional view of one embodiment of the instant invention.

Referring now to the drawing and more particularly to FIG. 1, wherein one embodiment of the instant pendulum damper, generally designated by reference numeral 10, is shown as having base 12 with a plurality of peripherally spaced apertures 14 therethrough. Although shown as being cylindrical, container 16 may be of any cross-sectional configuration that has a cross dimension less than the distance between opposed apertures 14. Brackets 18 are secured adjacent the end of container 16 opposite that to which base 12 is secured. Tray assembly 20 is so dimensioned as to fit within container 16 and includes vertical posts or support members 22 to which trays 24 are secured for supporting ellipsoidal slugs 26. Viscous liquid 28, for example, a silicon fluid, substantially fills container 16 and encompasses tray assembly 20 to provide a viscous liquid cover for all of slugs 26 on each of trays 24.

Container 16 is sealed by cover assembly 30 including flange ring 32 rigidly secured thereto. Upper cover plate 34 is provided with a plurality of peripherally spaced apertures 36 for receiving screws 38 extending into flange ring 32 for attaching cover plate 34 securely to ring 32 and holding seal 40 in position. Trays 24 have a spherically concave upper surface that is substantially symmetrical about longitudinal centerline 42 of container 16. The spherically concave upper surface of trays 24 permit slugs 26 to slide on the surface thereof so that in effect the slug behaves as though it were a bobweight of a pendulum which has freedom to move in substantially any horizontal direction.

Figure 3:
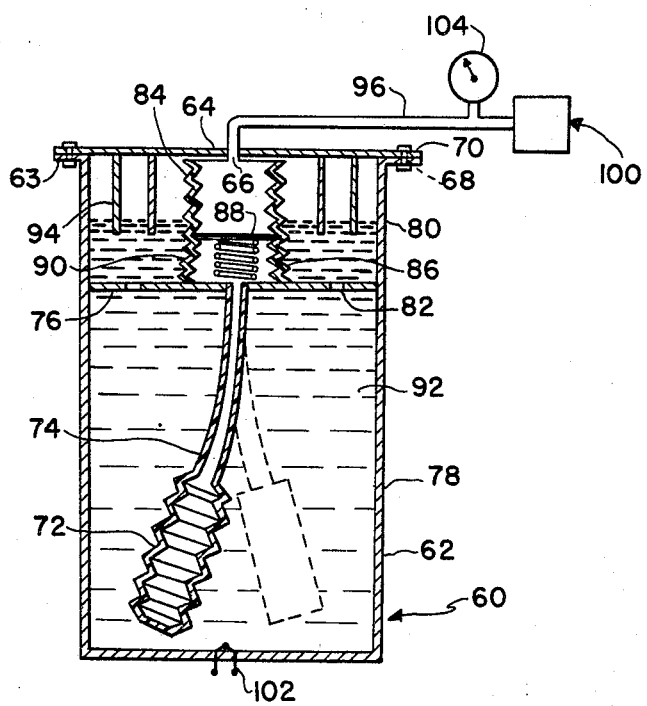
FIG. 3 is a cross-sectional schematic of an alternative embodiment of the instant invention.

Referring now to FIG. 3 wherein an alternative embodiment of the instant invention is shown with remotely controlled viscous pendulum damper designated 60. This embodiment includes container 62 having a flange 63 adjacent the open end thereof to provide a cup-shaped member. Cover 64 is provided with substantially centrally located orifice 66 and a plurality of peripherally spaced apertures 68 that receive bolts 70 for securing top 64 to flange 63 of container 62.

Pendulum bladder 72 is preferably formed from an expansible material, such for example as neoprene or fibrous rubber, and is attached to flexible tube 74 mounted on divider 76. Divider 76 is provided with a plurality of orifices 82 to establish communication between lower chamber 78 and upper chamber 80 formed in container 62 by divider 76. Actuator bellows 84 are attached to top 64 at one end and to mercury filled bellows 86 at the other end with bellows 86 being secured to divider 76 about the opening therein providing communication between tube 74 and the bellows. Diaphragm 88 is located at the juncture of bellows 84 and bellows 86 to react against both the mercury in bellows 86 and return spring 90. Viscous liquid 92 fills lower chamber 78 and partially fills vented expansion chamber 80 with orifices 82 permitting flow of fluid 92 between the two chambers upon expansion of pendulum bladder 72. Baffles 94 are secured to top 64 and extend downwardly into upper chamber 80 to act with orifices 82 in eliminating slosh motions of damping fluid 92.

Conduit 96 is attached to top 64 about orifice 66 by a conventional connection (not shown) and extends to a regulated pressure source designated as remote pressure controller 100 which is of conventional construction and accordingly a description thereof is unnecessary. In order to accurately determine the pressure in conduit 96, pressure gage 104 is inserted therein near controller 100. The damper performance is dependent on viscosity of damping fluid 92 which is affected to some extent by temperature. Accordingly, thermocouple 102 is mounted in container 62 and utilized to permit calibration of damping with temperature.

Figure 5:
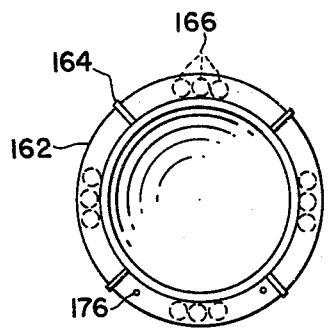
FIG. 5 is a plan view of the embodiment of the instant invention shown in FIG. 4.
Figure 4:
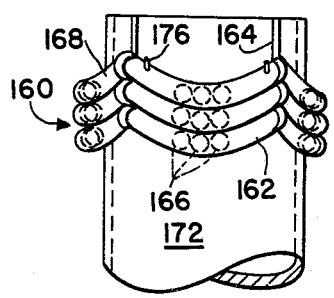
FIG. 4 is an elevational view of a structure utilizing an alternative embodiment of the instant invention.
Figure 6:
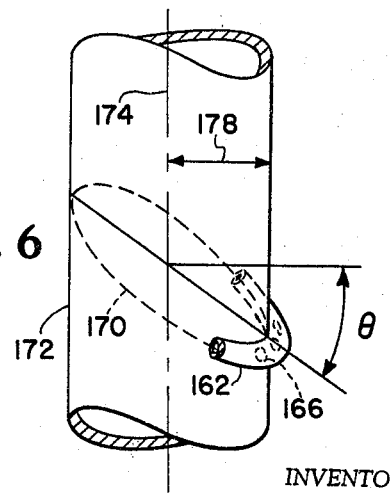
FIG. 6 is a partial elevational view of the embodiment of FIG. 4 showing the quantities necessary for determining the tuned or untuned operation of the embodiment of FIG. 4.

FIGS. 4–6 show an alternative embodiment of the instant inventive damper, designated 160, and adapted for use with a smokestack, or other elongated body 172. Damper 160 includes tubular container 162 that depends from support 164 attached to body 172. Tubes 162 are scallop shaped and conform approximately to the arc of a circle along their lower edge to provide a support surface for spherical pendular masses 166 to give them a pendular movement against viscous fluid 168 which substantially fills tubes 162. As in previous embodiments of the instant invention, masses 166 act against viscous fluid 168 to dissipate energy and thereby dampen the oscillatory motion of body 172. Although shown in FIG. 4 as having three tubes 162, it is readily apparent that any number of such tubes may be utilized depending upon the magnitude of the forces being dampened. Fluid valves 176 are located in tubes 162 to provide access to the interior thereof for permitting changes of the viscous fluid or additions or removals thereof.

The number of spherical masses 166 and the number of arcuate deflections or scallops of tubes 162 may be varied in order to provide either tuned or untuned operation of damper 160. Referring to FIG. 6, smokestack or body 172 is shown as being symmetrical about centerline 174 and in this instance is cylindrical having radius 178. Plane 170 extends through the center of spherical masses 166 and forms angle $\theta$ with a line at right angles to centerline 174. In order to design damper 160 for tuned operation the skilled artisan will readily recognize that the pendulum frequency of damper 160 is a function of radius 178 and angle $\theta$. The weight and surface area of masses 166, as well as the viscosity of fluid 168, are factors which control energy dissipation of the damper.

FIGS. 7–10 show a further alternative embodiment of the instant inventive damper, designated as 110. This embodiment is constructed of one or more modules 112 which have a plurality of interfitting intermediate trays 124 that fit and mate with bottom tray 114 and top tray 130 as will be described more fully hereinafter. Bottom tray 114 has a spherical section bottom 116 terminating at its outer edges in upwardly extending lower sidewall portion 118. Sidewall extension 120 connects upper sidewall portion 122 to lower sidewall portion 118. Each of trays 114, 124 and 130 is of exactly the same construction wherein the outer dimension of lower sidewall portion 118 is equal to or slightly less than the interior dimension of upper sidewall portion 122. This construction permits lower sidewall 118 to interfit within upper sidewall 122 and thereby permits assembly of a stack of interfitting trays to form module 112.

Intermediate trays 124 have a plurality of apertures 126 in the hemispherical bottom thereof to permit communication and flow of the viscous fluid, not shown, to flow between the various trays. Obviously, bottom tray 114 does not include such apertures in order to maintain the fluid tight relationship of module 112. Slugs 128 are disposed on the upper surface of the hemispherical bottoms of trays 114 and 124 and are shaped to have upper and lower surfaces substantially conforming to the arc of bottom 116 of the trays.

Top tray 130 also has at least two apertures 126 about which bosses 132 are located. Threaded bores 134 in bosses 132 are located so as to permit communication with the interior of trays 124 and 114. Plugs 136 are threaded to matingly engage threaded bores 134 and act to maintain a fluid tight module 112. At least two bosses 132 and their attendant structure are necessary in order that a viscous fluid may be poured into one opening while the other provides a vent for displaced air. Module 112 is completed by providing fiberglass cover 138 about a plurality of stacked trays to maintain module 112 fluid tight and an integral member.

Module 112 is further maintained as an integral assembly by the support structure for attaching damper 110 to the vibrating body. This mounting or supporting structure includes bottom ring 140 having a plurality of apertures 142 peripherally spaced thereabout. The internal diameter or dimension of ring 140 is equal to or slightly greater than the external dimension of lower sidewall portion 118. Such dimensions permit bottom tray 114 to fit within and be supported by ring 140. Top plate 144 has a plurality of peripherally spaced apertures 148 and 150 therein. Plate 144 overlies top tray 130 and is positively connected to ring 140 by bolts 152 extending through apertures 142 and 148. Nuts 154 matingly engage bolts 152 to positively connect bottom ring 140 and top plate 144.

The undersurface of top plate 144 has ring 146 extending therefrom. Ring 146 has an outer dimension equal or slightly less than the internal dimension of top tray 130 to permit ring 146 to fit within tray 130 and thereby maintain an integral assembly for damper 110. Bosses 132 and ring 146 are so dimensioned as to permit the positive assembly of damper 110 without interference by their encountering one another.

Figure 8:
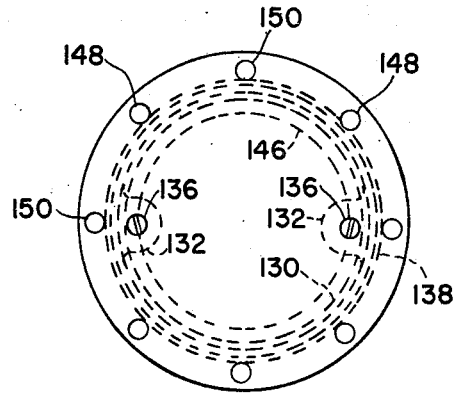
FIG. 8 is a top view of the embodiment of the instant invention shown in FIG. 7, again with portions omitted for clarity.
Figure 7:
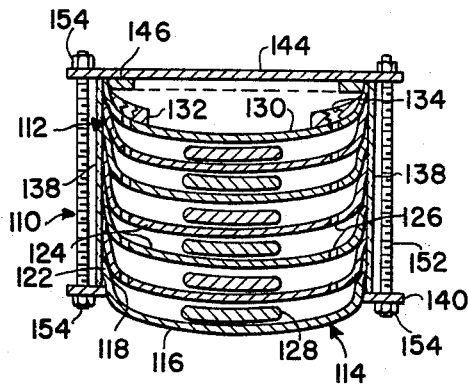
FIG. 7 is an elevational sectional view, with portions omitted for clarity, of a further embodiment of the instant invention.
Figure 9:
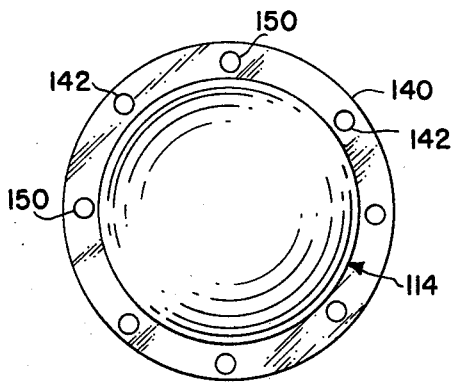
FIG. 9 is a bottom view of the embodiment of FIG. 7 with portions omitted for clarity.

Referring to FIG. 8, apertures 148 and 150 are shown as spaced about top plate 144. As set forth hereinabove, apertures 148 are utilized for bolts 152 to maintain damper 110 integral. Alternate apertures 150 serve as a means for permitting damper 110 to be attached or mounted to the vibrating or oscillating body. FIG. 9 shows apertures 142 and 150 as alternately spaced about ring 140. Again alternate apertures 150 may function to mount damper 110 to a vibrating body when necessary. Although damper 110 is shown herein as being of circular configuration in plan view, it is to be understood that substantially any configuration in plan may be utilized without departing from the concept of the instant invention.

Figure 10:
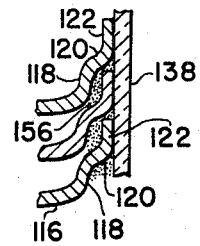
FIG. 10 is an elevational detail view of a portion of the embodiment shown in FIG. 7.

Epoxy 156 is shown in FIG. 10 as providing an adhesive and seal between lower sidewall portion 118 and upper sidewall portion 122 of interfitting trays 114, 124 and 130. The instant invention does not contemplate restriction or specific use of epoxy 156 and depending upon the relative interfitting of adjacent trays it may be unnecessary to provide any type of adhesive or seal to assist in maintaining an integral assembly of module 112. It is to be noted that the structure shown in FIG. 10 is out of proportion in order to clarify the location of seal material 156.

OPERATION

Either of the viscous pendulum damper embodiments of the instant invention would be attached to a primary structure which is either being tested or in which there is some vibration displacement. When this primary structure to which the dampers are attached experiences acceleration, that is, an oscillatory or vibratory motion, the pendulum mass, having inertia, resists being accelerated. The resistance of the pendulum to acceleration results in relative motion between the pendulum mass and the surrounding viscous medium causing energy to be dissipated. The amount of energy dissipated is dependent on the resistance force acting on the pendulum mass. If there is zero resistance the net work dissipated per cycle of oscillation is zero. On the other hand, if there is infinite resistance such that the pendulum mass is effectively frozen the mass does not move relative to the viscous medium and there is again zero net work dissipated per cycle. Consequently, it can be seen that there is some finite resistance or damping force on the pendulous member for which maximum energy dissipation occurs.

The value of this optimum resistance depends on the mode of operation of the damper which can either be tuned or untuned. For tuned operation the natural frequency of the damper is approximately the same as that of vibration frequency of the primary structure. For untuned operation it is implied that the pendulum natural frequency is very low relative to the input vibration frequency of the primary structure. The damping efficiency of a tuned viscous pendulum damper is much higher than that of an untuned; however, in many practical applications where, for example the input vibration occurs at relatively high frequencies or consists of a continuous spectrum rather than discreet frequencies, untuned operation is preferred.

Viscous pendulum damper 10, see FIG. 1, is shown as having eight disk-shaped slugs 26 and a tray assembly 20 containing eight trays 24. A lead slug 26 is placed on each of the trays and tray assembly 20 inserted into container 16. Viscous fluid 28 is then poured into container 16 and cover plate 34 secured in place by screws 38. Container 16 may previously have been secured to a primary structure, for example a test model in a wind tunnel or such structures as smokestacks, antennas, bridges or drilling rigs, or it may be secured to such a structure subsequent to assembly. Once vibration damper 10 is secured to the primary structure which is vibrating, the viscous fluid reacts with the slugs to dissipate energy. Since the radius of curvatures of the trays determines the natural frequency of the system the damper may be designed for either tuned or untuned operation as best suits the purpose.

Figure 2:
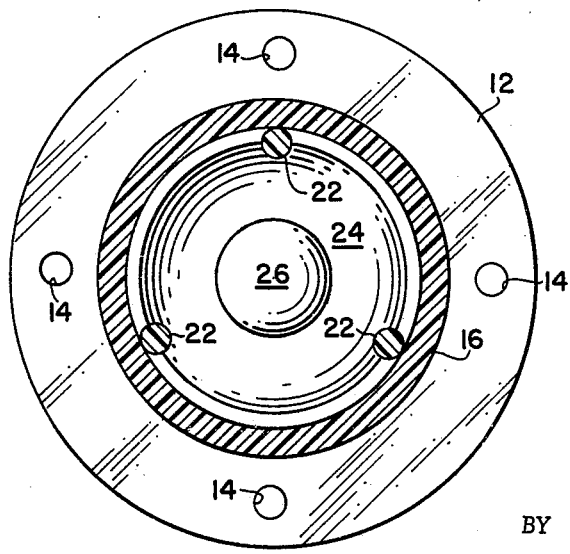
FIG. 2 is a cross-sectional view taken on line 2—2 of FIG. 1.

In the installation shown in FIGS. 1 and 2 the damper is designed for untuned operation. That is, the natural frequency of the model or primary structure to which this embodiment would be attached would be considerably greater than the pendulum frequency of the slugs. Normally under such circumstances the tray curvature provides essentially a self-centering feature for slugs 26. However, the damping ability of viscous pendulum damper 10 may be readily varied by changing either the size or the total number of slugs. By adding or removing slugs 26 the damping can be varied in increments of approximately one-eighth the maximum damping with all eight slugs present. Thus, the damping phenomenon closely follows the behavior predicted by the linear theory for viscous damping over a substantial range of vibration amplitudes. This feature makes the device particularly attractive as a research tool. For example, damper 10 may be attached to a test model and by varying the number of slugs 26 the damping required to prevent excessive vibrations may be determined, thereby providing the data necessary for protection of the primary structure from destructive oscillations.

The remotely controlled viscous pendulum damper shown in FIG. 3 functions, in principle, in the same manner as multislug damper 10 discussed previously. However, rather than removing or adding slugs to vary the damping, the pendulum mass in this case is varied by transferring mercury or some other heavy liquid from bellows 86, rigidly attached to damper case or container 62, to expansible bladder 72 which is suspended as a pendulum in viscous fluid 92. Bellows 86 are connected to and in communication with bladder 72 by flexible tube 74 which constrains bellows 86 to move in a pendulous path. The mass contained in bladder 72 is controlled by means of air pressure in actuator bellows 84. This pressure is controlled by regulated pressure source 100 and is read on pressure gage 104 which assists in accurately setting the pressure in conduit 96 and therefore accurate determination of the pressure actuator bellows 84. The pressure in actuator bellows 84 acts against return spring 90 which is of sufficient strength to collapse pendulum bladder 72 when pressure is removed therefrom.

As is evident from FIG. 3, when remote control is unnecessary, bellows 84 and 86 could be operated by a local control, for example a screw threaded through cover 64, acting thereagainst.

The quantity of mercury or other heavy liquid, and thus the damping of the system, can be calibrated against the pressure read on gage 104. Since the damper performance is dependent upon viscosity which is affected by temperature, thermocouple 114 is utilized for accurate calibration and, accordingly, is utilized with pressure gage 104 for an accurate setting of diaphragm 88 and associated return spring 90. Viscous fluid 92 completely fills lower chamber 78 and by means of orifices 82 partially fills vented upper chamber 80 which is provided with baffles 94 to eliminate slosh motion of the damping fluid.

When the primary structure to which damper 60 is attached vibrates, pendulum bladder 72 reacts with viscous fluid 92 to dissipate energy and thereby damp the vibrations of the primary structure.

The alternative embodiment of the instant invention designated as damper 110 operates substantially identically to the embodiment shown in FIGS. 1 and 2. However, by utilizing a plurality of trays that interfit with one another it is possible to readily vary the number of trays and therefor the number of slugs which determine the pendular mass and thus the energy dissipating ability of the damper. Because bosses 132 are of a depth permitting bottom trays 114 to interfit with top trays 130, a plurality of modules 112 may be assembled and even greater versatility and variation of damping ability provided.

Damper 110 is formed by placing slugs 128 on the hemispherical bottoms 116 of trays 114 and 124 and then stacking such trays until the sum of the masses of slugs 128 equal the mass necessary for damping the oscillations of the body to which damper 110 is to be secured. Top tray 130 is then positioned on the top intermediate tray 124 and a viscous fluid is poured into the stacked trays via bores 134 and flows from one tray to the next by means of apertures 126 with the displaced air being vented through the opposite bore 134. Plugs 136 are then threaded into bores 134 and module 112 is fluid tight. In order to further the integral relationship of trays 114, 124 and 130 fiberglass cover 138 is then put around the assembled unit. Module 112 is then placed on ring 140 and top plate 144 put in position and nuts 154 threaded on bolts 152 to provide positive connection and insurance of integrity of module 112. Damper 110 would then be mounted on the oscillating structure by any desired means, for example, by utilizing apertures 150 in either top plate 144 or bottom ring 140.

Damper 160, shown in FIGS. 4–6 also functions as previously described embodiments in that tubes 162 form approximately the arc of a circle and support spheres 166 for pendular movement in viscous fluid 168. Once spheres 166 are in place and viscous fluid 168 is poured into containers 162 via valve 176, damper 160 is mounted upon vibrating body 172 by supports 164. The oscillatory motion of body 172 causes spherical masses 166 to move as constrained along the arc established by container 162 to act against fluid 168 and thereby dissipate energy and overcome the oscillatory forces of body 172. Again it is to be noted that the embodiment of the invention shown in FIGS. 4–6 is cylindrical but the invention does not contemplate such a limitation and it is to be understood that any configuration of body 172 may fit within the ability of damper 160 to suppress oscillations thereof.

In view of the above discussed features of the instant invention, it is readily apparent that there is a multitude of potential applications including reduction of wind induced vibration on full scale structures such as rocket launch vehicles, smokestacks, large antennas, bridges and drilling rigs; elimination of wake induced oscillations of submarine periscopes; and protection of machines, instruments or equipment from excessive vibrations, as well as serving as a time saver in tests being run in facilities requiring a pumping cycle each time an entry is made into the test section.

From the above it is readily apparent that the instant invention provides the advantages of linear damping characteristics, bidirectional operation, and precise regulation of damping for either tuned or untuned operation. The instant invention also does away with the problems commonly associated with tuned spring mass dampers having spring stress problems and saves time in research studies while not requiring guy wires or external connections for damping which avoids aerodynamic problems associated therewith. Further, the device of the instant invention is a simple inexpensive way of providing remotely controlled damping means.

Obviously, many modifications and variations of the subject invention are possible in the light of the above teachings.

What is claimed as new and desired to be secured by Letters Patent of the United States is:

1. In a viscous pendulum damper the combination comprising: a container; variable mass pendulum means mounted in said container; means for varying the mass of said pendulum means; control means for operating said means for varying the mass of said pendulum means; and a viscous fluid in said container covering said pendulum means whereby the mass of said pendulum means may be varied to alter the damping characteristics of the damper.

2. The viscous pendulum damper of claim 1 wherein said control means are located remotely from said container and are interconnected therewith by conduit means.

3. The damper of claim 1 wherein said pendulum means comprises a bladder flexibly mounted in said container.

4. The damper of claim 1 wherein said container comprises upper and lower chambers interconnected by orifices to compensate for variation of the mass of said pendulum means.

5. The damper of claim 1 wherein a divider is secured within said container for separation thereof into upper and lower chambers; and orifices in said divider to provide communication between said chambers.

6. The damper of claim 1 wherein the means for expanding the pendulum means comprises actuator bellows and fluid filled bellows separated by a diaphragm.

7. The damper of claim 6 wherein spring means are located in said fluid filled bellows for returning said diaphragm to a neutral position; and said fluid filled bellows rigidly attached to said container.

8. The damper of claim 7 wherein said pendulum means comprises a bladder flexibly mounted in said container.

9. The damper of claim 8 wherein a divider having a plurality of orifices is secured within said container to form upper and lower chambers; and said bladder flexibly mounted on said divider to protrude into said lower chamber.

10. The damper of claim 9 wherein said fluid fills said lower chamber and a portion of said upper chamber; and baffles in said upper chamber for eliminating slosh motions of said fluid.

11. The damper of claim 10 wherein said control means is located remotely from said container and connected to said actuator bellows by a conduit having a pressure gage operably attached thereto.

12. The damper of claim 11 wherein a thermocouple is mounted in said lower chamber of said container to permit calibration of damping by coordination of temperature and pressure.

13. A viscous pendulum damper comprising: tubular container means having a plurality of scalloped sections; each of the scallop sections of said container means substantially conforming to a segment of a circular arc; a plurality of masses disposed in said scalloped sections for pendular movement; a viscous fluid substantially filling said container; and means which support said container from the oscillating body, where variation of the viscosity of the fluid, of the mass of the spherical masses and of the number of tubular elements in the container means alter the damping characteristics and permit calibration of the damper.

References Cited

UNITED STATES PATENTS

| | | |
|---|---|---|
| 1,700,477 | 1/1929 | Goode. |
| 2,028,197 | 1/1936 | Dunning. |
| 2,656,742 | 10/1953 | Poole. |
| 3,113,640 | 12/1963 | Stedman. |

DUANE A. REGER, Primary Examiner

U.S. Cl. X.R.

188—101